June 3, 1958    J. W. THROCKMORTON ET AL    2,837,065
FURNACE CONSTRUCTION

Filed Jan. 8, 1953      3 Sheets-Sheet 1

INVENTORS
John W. Throckmorton
BY John S. Wallis

ATTORNEY

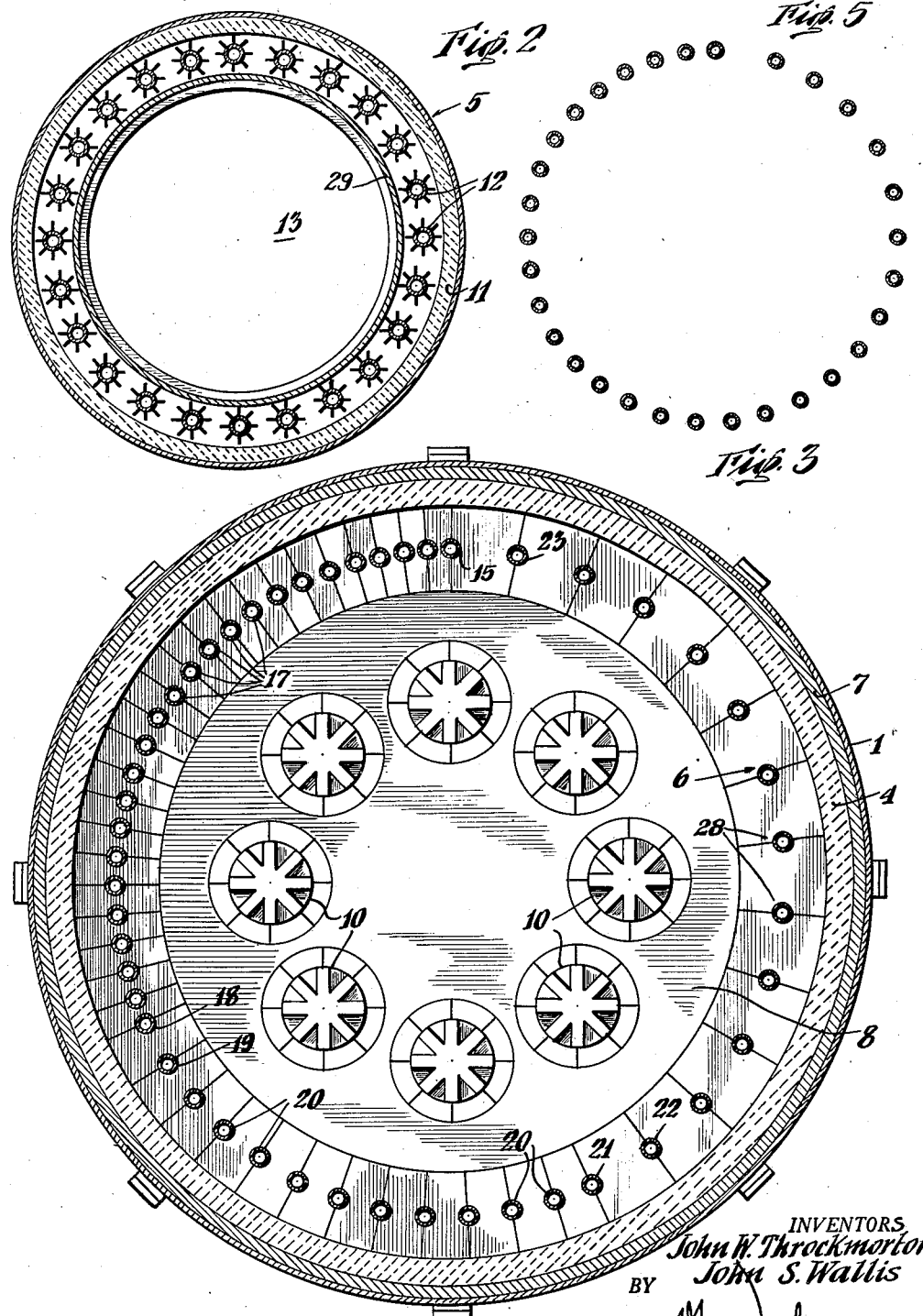

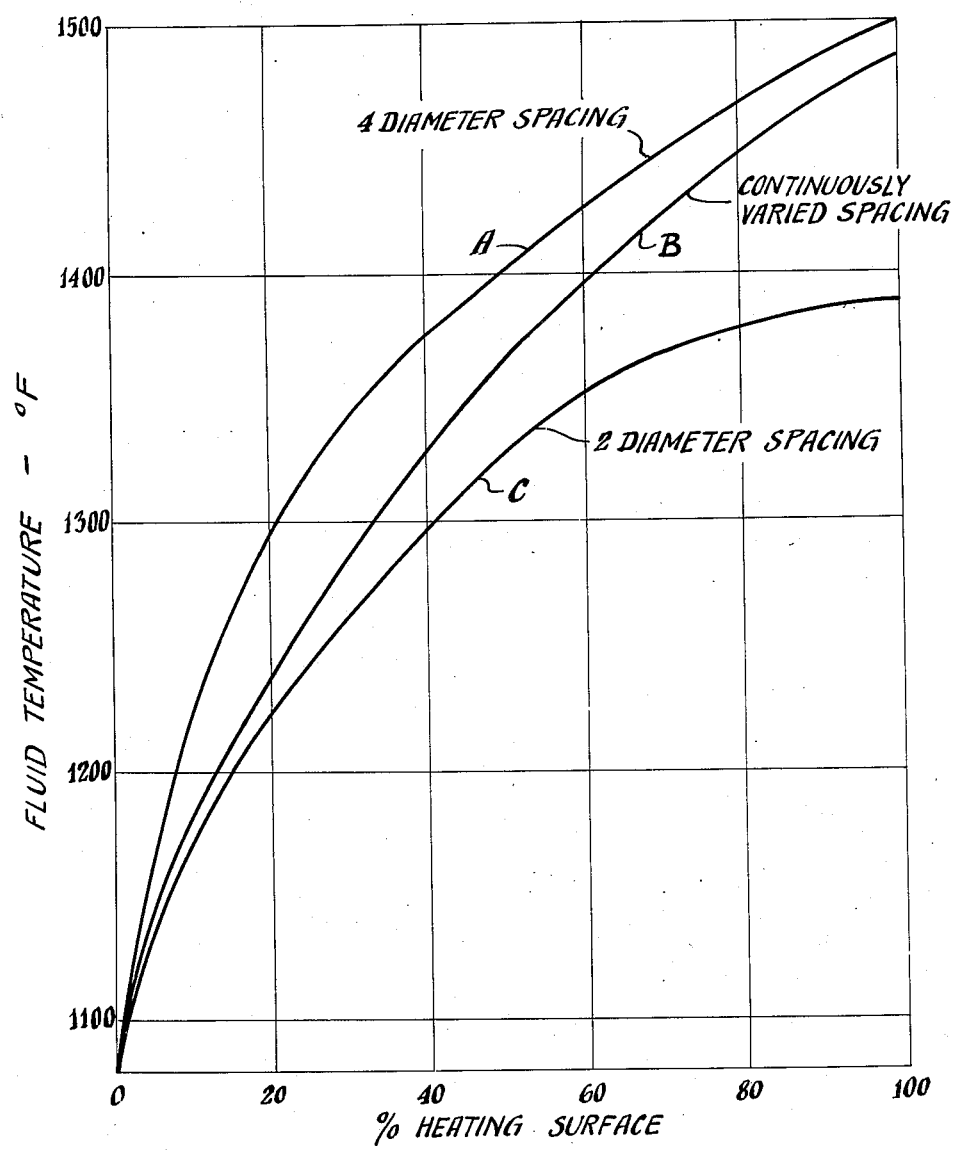

United States Patent Office 2,837,065
Patented June 3, 1958

2,837,065

FURNACE CONSTRUCTION

John W. Throckmorton and John S. Wallis, New York, N. Y., assignors to Petro-Chem Process Company, Incorporated, New York, N. Y., a corporation of Delaware Application January 8, 1953, Serial No. 330,192

4 Claims. (Cl. 122—356)

Our invention pertains to vertical heaters and furnaces having a cylindrical bank of vertical tubes and a central flame by which the tubes are heated largely by radiation.

In heaters of this type such as those shown in our U. S. Patents 2,333,077, issued October 26, 1943, and 2,340,287, issued February 1, 1944, the tubes are arranged in a single cylindrical bank and are surrounded by a refractory lining within a metal cylinder which forms the furnace wall.

Burners are located at the bottom or at the top and produce a central flame which imparts its intense heat very efficiently to the tubes and to the exposed portion of the refractory furnace lining by radiation.

The tubes have been uniformly spaced and we have discovered that the spacing of the tubes makes a great difference as to the quantity of heat absorbed directly through the exposed surfaces of the tubes and as to the quantity of heat reflected from the hot refractory walls to the back surfaces of the tubes.

If the fluid to be heated such as hydrocarbon oil or water enters the tube bank at a low temperature, say 300° F. and leaves at a high temperature, say 1000° F. to 1500° F., the tubes having the lowest temperature fluid will absorb the greatest heat quantity and the tubes having the highest temperature fluid will absorb the least quantity of heat.

The object of our invention is to provide such a spacing of the tubes as to obtain a predetermined optimum input to each tube of the heater or to each group of tubes although the conditions of temperature and the phase of the fluid being heated and the rate of absorption vary widely.

Some of the advantages of our invention may be obtained by an equal spacing of the tubes in each of several groups of tubes and varying the spacing in each group as compared to the other groups. For example, the tube bank may be divided into three sectors, the tubes in the inlet sector being spaced close together, for example, 4½" O. D. tubes on 8" centers and the middle sector on 12" centers and the high temperature outlet sector on 16" centers.

A greater degree of refinement with increased advantages may be secured by plotting a curve of heat input desired, as hereinafter explained, and varying the tube spacing from the inlet end of the tube bank to the outlet end according to the conditions which obtain in each tube.

It is usually preferable from the standpoint of mechanical simplicity to divide the tube bank into several sectors with the tubes in each sector uniformly spaced thus making it possible to use uniform return bends in each sector and the number of sectors will depend on the size of the furnace and the requirements of the operation being conducted in the heater.

If for example an oil cracking operation is carried on, the temperature and phase—whether liquid, vapor or mixed—the outlet temperature and the type of oil to be treated will vary the optimum conditions. Some heaters are designed to discharge the oil from the coil immediately upon reaching top temperature while others are designed to level out and hold the temperature constant towards the outlet in order to provide a predetermined soaking time.

The tube temperature on the tube face directly exposed to the radiant heat of the flame is important to control so as to avoid overheating and if an optimum tube surface temperature is determined it is then desirable to insure that the indirect heat imparted to the back surfaces of the tubes by reradiation from the furnace wall is increased to get the maximum overall input.

Thus a further object is to provide a tube distribution which will give predetermined heat transfer rates which may vary from one tube to another.

Referring to the drawings:

Fig. 2 is a cross section on the line 2—2 of Fig. 1;

Fig. 3 is a cross section on the line 3—3 of Fig. 1;

Fig. 4 is a graph showing an example of applying the invention to the heating of gas in a cracking process; and Fig. 5 is a cross section of a tube circle corresponding to that of Fig. 3 in which the tube spacing varies gradually in a predetermined way as per curve B in Fig. 4.

Figure 1:
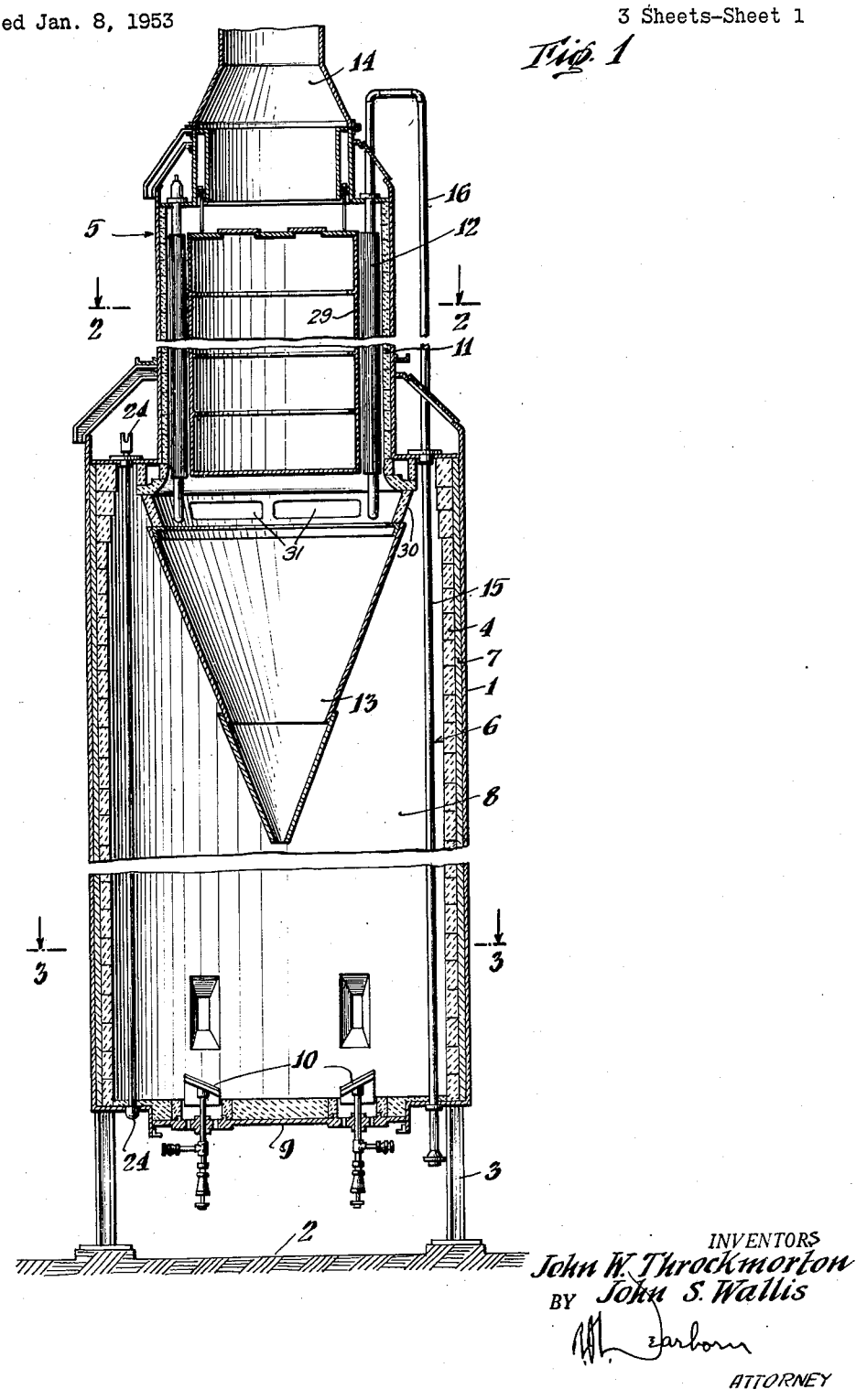
Fig. 1 is a sectional elevation of a heater embodying our invention.

The heater shown comprises a vertical cylindrical shell 1 supported above the foundation 2 by legs 3 and provided with an inner lining 4 of refractory material which is preferably spaced from the steel shell by insulation 7. A cylindrical upper furnace section 5 is coaxial with the main furnace shell 1 and is supported thereby.

Within the main furnace shell is a cylindrical bank of vertical tubes 6, which are spaced from one another as shown in Fig. 3 and located near, but spaced inwardly from, the refractory lining. A large open combustion chamber 8 is thus formed.

The furnace has a bottom plate 9 in which a ring of burners 10 is set so as to provide an upshot flame centrally within the chamber.

An inner concentric cylindrical refractory wall 11 is mounted within the upper furnace section 5 and together with a cylindrical baffle 29, forms an annular convection space in which fin tubes 12 are mounted and may constitute a preheater for the fluid supplied to the main furnace tubes.

A conical baffle 13 is supported by a ring 30 and hangs down into the furnace at the top and forces the hot gases to flow through openings 31 in the ring 30 and into and through the annular space around the fin tubes 12. The arrangement of the preheater tubes is shown in Fig. 2.

The upper end of the convection annulus is connected with the stack 14.

Referring particularly to Fig. 3, the oil or other fluid to be heated is introduced at inlet tube 15 by pipe 16 (Fig. 1) from the preheater and then flows in series through successive tubes 17 to the outlet tube 18 of this low temperature sector of the tube bank. Thence the oil enters tube 19 and flows successively through tubes 20 to outlet tube 21 of this intermediate sector of the tube bank. The oil then enters tube 22 and flows successively through tubes 28 of the high temperature sector of the bank to outlet tube 23. The tubes are connected at their ends in the usual manner by return bends indicated at 24 in Fig. 1.

The graph of Fig. 4 shows the fluid temperature in degrees Fahrenheit against the percentage heating surface of the tube bank under consideration. A hydrocarbon gas is the fluid in the tube bank being heated to high temperatures during a gas cracking operation.

Curve A shows conditions when four diameter spacing is used throughout the tube bank, curve C shows conditions when two diameter spacing is used throughout, and curve B shows conditions when variable spacing is employed in accordance with this invention.

The limitations of two diameter spacing (curve C) are apparent in that the maximum temperature for a given amount of heat input, is limited well below that where four diameter spacing is used (curve A). Among the objections to using four diameter spacing is that a great increase in the size of the furnace for a given capacity tube bank, is necessary due to the large increase in space consumed by the same number of tubes as when two diameter spacing is used.

Therefore by using a graduated spacing of from two to four diameters (curve B), substantially the same temperature may be reached as with four diameter spacing only; and, at the same time, the space necessary (size of the furnace) is not greatly increased over that for a furnace using two diameter spacing. This is one of the advantages to be gained by using variable spacing in accordance with this invention.

As will be discussed below, the reason that the higher temperatures may be reached with the wider spacing is that the unit of tube surface is much more effective at the wider spacing and is especially desirable at the higher fluid temperatures where the difference between the flame temperature and the fluid temperature is much less.

The purpose of using wider than normal spacing is to provide means for improving radiant heat absorption by the whole circumference of the tubes obtained by increasing the effectiveness of the back or the "shielded" portion of the tube circumference, which normally does not receive any appreciable direct radiation from the source, and gets only a small amount of the total available as reradiation from refractories behind the tubes.

In normal practice the tubes in the radiant section of tubular heaters are located with a center to center spacing of 1.75 to 2.25 diameters. Under these conditions, using a spacing of 2 as an example, the relative heat input intensity or "flux distribution" varies from a maximum of unity at the front, all due to direct radiation from the source in front of the tubes, to 0.34 at the back, all due to reradiation from the refractories behind the tubes. Intermediate points receive direct radiation and reradiation in varying proportions. The average intensity along the whole circumference for this spacing is 0.56 with the front of the circumference, the exposed half, receiving 70 percent of the total, or approximately 2.3 times as much as the shielded half. The ratio of maximum to average intensity is 1.79.

The effectiveness of the shielded half of the circumference and therefore of the whole circumference can be increased by increasing the spacing between the tubes. If the spacing is increased to 4 diameters and with the same maximum intensity of unity at the front of the tube the intensity at the back is 0.63, or approximately twice as great as that with a spacing of 2. The average intensity is 0.77, of which the exposed half receives 58 percent, or only 1.37 times as much as the shielded half, and the ratio of maximum to average intensity is 1.3. With a spacing of 4 and the same maximum intensity at the front, the whole tube circumference is 37 percent more effective than with a spacing of 2.

Table I shows two examples of the effects of spacing on radiant heat absorption rates. With values in column A as a basis, column B-1 shows that with the same intensity of firing, i. e. 30,000 B. t. u./hr./sq. ft. of effective surface, and the same maximum intensity of 18,500 B. t. u./hr./sq. ft. at the front, the tubes on a spacing of 4 will have average absorption rates of 14,000 B. t. u./hr./sq. ft. of circumferential surface as against 10,300 with a spacing of 2. If the average rates on the exposed half of the circumference and not the maximum intensity at the front are the determining factor, then, as shown in column B-2, for the same average of 7,200 B. t. u./hr./sq. ft. on the exposed half the tubes with a spacing of 4 will have average rates for the whole circumference of 12,400, or 20 percent higher than with spacing of 2 diameters (see column A) and will obtain these higher rates with milder firing (25,000 vs. 30,000), lower residual gas temperatures (1,400 vs. 1,460), and lower maximum intensity (16,100 vs. 18,400). The relationship as shown by comparison of column A with column B-2 is of particular importance in some high temperature pyrolysis where higher rates towards the end of the coil are required but where with the normal spacing this may result in higher maximum intensities than the alloy can safely withstand.

The values in Table I apply when the radiant heat absorption rates are uniform through the whole bank and where all tubes in the bank are at the same temperature. In most applications metal temperatures increase from inlet to outlet. Also, in a large number of applications it is desirable to apply increasingly higher heat input rates towards the end of the coil to compensate for higher heat requirements per degree temperature rise of the fluid being heated as it travels to the end of the coil.

Table II shows the effect of increased spacing with increasing metal temperatures. The table shows that with the same intensity of firing, 25,000 B. t. u./hr./sq. ft. of effective area, by increasing the spacing from 2D to 3D the total radiant heat transfer rates can be increased approximately 23 percent even though the metal temperature of the tubes with a wider spacing is 1000° F. If the spacing is increased to 4D, the rates could be increased 37 percent over a spacing of 2D even though the temperature of the metal of the tubes with 4D spacing is increased from 800° to 1200° F.

The foregoing analysis demonstrates that a change of spacing through the coil, gradual or in steps, can be used to meet the needs of any process with increasing or decreasing heat requirements towards the end of the coil, or, as shown on Table II, to reduce the maximum intensity of heat applied to the tubes while maintaining the same or higher average rates of heat input. The latter is particularly valuable in high-temperature pyrolysis, such as production of ethylene and other petro-chemicals, or in superheating of heat-carrying fluids to high temperatures where the maximum permissible heat intensity is the limiting factor of the overall rates which can be used without exceeding the maximum allowable temperature for the alloy.

It will be evident from the above that this invention may be adapted to various uses. For example, in some instances it might be desirable to have wide spacing at the input end of a coil or bank of tubes, and then to decrease the spacing toward the output end of the bank.

While we have described the best mode of using our invention as we now see it, this should not be taken as limiting our invention in any way but merely as a description thereof.

TABLE I

Radiant heat absorption rates

[A for spacing 2D; B for spacing 4D where D=outside diameter of tubes.]

| | A | B-1 | B-2 |
|---|---|---|---|
| 1. Liberation, B. t. u./hr./sq. ft. of effective area of bank | 30,000 | 30,000 | 25,000 |
| 2. Flame burst temperature, °F | 3,400 | 3,400 | 3,400 |
| 3. Metal temperature, °F | 800 | 800 | 800 |
| 4. Absorption, B. t. u./hr./sq. ft. of effective area of bank | 18,500 | 18,500 | 16,200 |
| 5. Equilibrium gas (residual) temperature of gases, °F | 1,460 | 1,460 | 1,400 |
| 6. Absorption, B. t. u./hr./sq. ft. of circumferential area | 10,300 | 14,100 | 12,400 |
| 7. Maximum intensity (B. t. u./hr./sq. ft.) | 18,400 | 18,400 | 16,100 |
| 8. Absorption by exposed half B. t. u./hr./sq. ft. | 7,200 | 8,200 | 7,200 |
| 9. Absorption by shielded half | 3,100 | 5,900 | 5,200 |

TABLE II

*Effect of spacing on radiant heat absorption rates*

|  | A | B | C |
| --- | --- | --- | --- |
| Spacing | 2D* | 3D | 4D |
| Liberation, B. t. u./hr./sq. ft. of effective area of bank | 25,000 | 25,000 | 25,000 |
| Flame burst temperature, °F | 3,400 | 3,400 | 3,400 |
| Metal temperature, °F | 800 | 1,000 | 1,200 |
| Absorption B. t. u./hr./sq. ft. of circumferential | 9,100 | 11,200 | 12,400 |
| Percent increase over A | 0 | 23 | 37 |

*(D = outside diameter of tubes.)

We claim:

1. A vertical tube fluid heater comprising an upright cylindrical furnace shell having a ceramic lining, a single cylindrical bank of vertical tubes within the furnace shell, said tubes being close to but spaced from the ceramic lining, and means for connecting the tubes in series to form a hollow cylindrical heating coil, upshot burners at the bottom of the furnace adapted to discharge flame and hot gases axially upward within the heating coil, whereby the tubes are heated by direct radiation from the flame and hot gases and by reradiation from the ceramic lining, the tubes of said hollow cylindrical coil spaced relatively close together near the inlet end of the coil where the fluid to be heated enters at a low temperature, and relatively far apart near the outlet end of the coil where the fluid has already reached a comparatively high temperature.

2. A vertical tube fluid heater comprising an upright cylindrical furnace shell having a ceramic lining, a single cylindrical bank of vertical tubes within the furnace shell, said tubes being close to but spaced from the ceramic lining, means for connecting the tubes in series to form a hollow cylindrical heating coil, upshot burners at the bottom of the furnace adapted to discharge flame and hot gases axially upward within the heating coil whereby the tubes are heated by direct radiation from the flame and hot gases and by reradiation from the ceramic lining, the tubes of said hollow cylindrical coil spaced relatively close together near the inlet end of the coil where the fluid to be heated enters at a low temperature and relatively far apart near the outlet end of the coil where the fluid has already reached a comparatively high temperature, and intermediate tubes spaced apart more widely than those near the inlet and less widely than those near the outlet end of the coil.

3. A vertical tube fluid heater comprising an upright cylindrical furnace shell having a ceramic lining, a single cylindrical bank of vertical tubes within the furnace shell, said tubes being close to but spaced from the ceramic lining, and means for connecting the tubes in series to form a hollow cylindrical heating coil, upshot burners at the bottom of the furnace adapted to discharge flame and hot gases axially upward within the heating coil, whereby the tubes are heated by direct radiation from the flame and hot gases and by reradiation from the ceramic lining, the tubes of said hollow cylindrical coil spaced at progressively greater width from the inlet end to the outlet end of the coil so that the percentage of heat applied to the tubes by reradiation relatively to the heat applied by direct radiation is increased as the temperature of the fluid being heated is increased.

4. A vertical tube fluid heater comprising an upright cylindrical furnace shell having a ceramic lining, a single cylindrical bank of vertical tubes within the furnace shell, said tubes being close to but spaced from the ceramic lining, means for connecting the tubes in series to form a hollow cylindrical heating coil, upshot burners at the bottom of the furnace adapted to discharge flame and hot gases axially upward within the heating coil, the tubes of said hollow cylindrical coil spaced relatively close together near the inlet end where fluid to be heated enters at a low temperature and relatively far apart at the outlet end, and intermediate tubes spaced apart more widely than those near the inlet and less widely than those near the outlet whereby the tubes are heated by direct radiation from the flame and hot gases and by reradiation from the ceramic lining, the percentage of heat applied by reradiation to that applied by direct radiation being increased as the spacing between the tubes of the coil increases.

References Cited in the file of this patent

UNITED STATES PATENTS

| 1,804,155 | DeFlorez | May 5, 1931 |
| 1,828,814 | Lucke | Oct. 27, 1931 |
| 2,112,224 | Alther | Mar. 29, 1938 |
| 2,333,077 | Wallis et al. | Oct. 26, 1943 |

FOREIGN PATENTS

| 463,549 | Italy | May 12, 1951 |